United States Patent
Smith (10) Patent No.: US 7,109,998 B2
(45) Date of Patent: Sep. 19, 2006

(54) STATIONARY SEMANTIC ZOOMING

(75) Inventor: Randall B. Smith, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 163 days.

(21) Appl. No.: 09/970,082

(22) Filed: Oct. 3, 2001

(65) Prior Publication Data

US 2003/0063094 A1   Apr. 3, 2003

(51) Int. Cl.
*G09G 5/00* (2006.01)
(52) U.S. Cl. .................................... 345/581
(58) Field of Classification Search ............... 345/428, 345/473, 581, 589, 592, 619, 582; 715/907
See application file for complete search history.

(56) References Cited

U.S. PATENT DOCUMENTS

| | | | | |
|---|---|---|---|---|
| 4,723,209 | A * | 2/1988 | Hernandez et al. ......... | 715/521 |
| 5,367,615 | A * | 11/1994 | Economy et al. ........... | 345/441 |
| 5,471,572 | A * | 11/1995 | Buchner et al. ............ | 345/671 |
| 5,598,182 | A * | 1/1997 | Berend et al. .............. | 345/619 |
| 5,608,850 | A * | 3/1997 | Robertson .................. | 345/427 |
| 5,720,018 | A * | 2/1998 | Muller et al. ............... | 345/581 |
| 5,945,992 | A * | 8/1999 | Cunniff ...................... | 715/748 |
| 6,072,478 | A * | 6/2000 | Kurihara et al. ......... | 715/500.1 |
| 6,154,213 | A | 11/2000 | Rennison et al. | |
| 6,301,579 | B1 | 10/2001 | Becker | |
| 6,429,875 | B1 * | 8/2002 | Pettigrew et al. ........... | 345/591 |
| 6,476,829 | B1 * | 11/2002 | Smith et al. ................ | 345/764 |
| 6,819,344 | B1 * | 11/2004 | Robbins ..................... | 715/848 |
| 2002/0008704 | A1 * | 1/2002 | Sheasby et al. ............. | 345/475 |
| 2002/0050995 | A1 * | 5/2002 | Crotty et al. ............... | 345/440 |
| 2002/0054117 | A1 * | 5/2002 | van Dantzich et al. ..... | 345/766 |
| 2003/0076321 | A1 * | 4/2003 | Clavadetscher ............. | 345/427 |

OTHER PUBLICATIONS

Thomas Chester and Richard H. Alden, Mastering Excel 97, © 1997, Sybex, Fourth Edition, p. 6, 122, 123, 128 and 133.*
Jonas Gomes, Lucia Darsa, Bruno Costa, Luiz Velho; Warphing and Morphing of Graphical Objects; © 1999; Morgan Kaufman Publishers; p. 345-346.*
Ahlbert and Shneiderman "Visual Information Seeking: Tight Coupling of Dynamic Query Filters with Starfield Displays", ISR Technical Research Report, Sep. 1993, 11 pages.

* cited by examiner

*Primary Examiner*—Kee M. Tung
*Assistant Examiner*—G. F. Cunningham
(74) *Attorney, Agent, or Firm*—Robert C. Kowert; Meyertons, Hood, Kivlin, Kowert & Goetzel, P.C.

(57) ABSTRACT

A system and method for stationary semantic zooming. Stationary semantic zooming allows selected non-spatial rendering attributes, such as level of detail, to be varied according to other specified non-spatial rendering attributes. Stationary semantic zooming allows low importance objects to be rendered with a lower level of detail than higher importance objects. A system and method for displaying network status and realty information using stationary semantic zooming are also disclosed.

29 Claims, 8 Drawing Sheets

STATIONARY SEMANTIC ZOOMING

BACKGROUND

1. Field of the Invention

This invention relates generally to the field of computer graphics and, more particularly, to software for rendering graphics data.

2. Description of the Related Art

As the pervasiveness of computers increases, the amount of information that applications and users need to display has also increased. The problem of displaying ever increasing amounts of information is exacerbated by the recent trend toward smaller displays. For example, personal digital assistants are becoming more popular because of their portability. However, this portability tends to require smaller displays. Thus, system designers are facing the difficult task of having to display increasing amounts of information on smaller screens.

Desktop personal computers and workstations are facing similar problems. With the processing power now available, it is possible to simultaneously run a large number of applications, each having multiples windows and/or documents open at the same time. Applications routinely manipulate very large databases of information, and the results tend to overflow current displays. Thus, even with increases in desktop screen size, displays are becoming even more crowded.

One common technique currently in use that allows a particular screen size or window to display more information is called "scrolling" or "zooming". In scrolling, the window displays only a portion of the entire image, and the user is able to shift which portion of the entire image is shown in the current window. In zooming, a portion of the image being displayed is magnified (usually to show more detail) at the expense of displaying other portions of the image. Scrolling and zooming are often combined to create an effective user interface. For example, mapping software may display a detailed map of an eastern section of a city. The user may "zoom out" to display the entire city (at a lower level of detail), scroll over to the western section of the city, and then "zoom in" on a final destination to see more detail.

Techniques such as scrolling and zooming have increased the amount of information that may be accessed using a given screen size. However, these techniques may not go far enough to allow large amounts of data to be viewed on a given screen size. Another class of techniques that attempt to address this problem allow users to vary non-positional (i.e., non-spatial) display attributes such as transparency and size. However, these techniques can be inefficient and sometimes distracting. Particularly when an object is drawn as small, highly transparent, or in an otherwise non-prominent state, it can be both computationally inefficient and a potential distraction to the user to create a highly detailed rendering of the object.

For at least these reasons, a system and method for efficiently displaying information on a computer display is desired.

SUMMARY

The problems outlined above may at least in part be solved in some embodiments by a system and method for rendering and displaying graphical information on a computer by using stationary semantic zooming. Stationary semantic zooming allows selected non-spatial rendering attributes (e.g., level of detail) to be varied according to other specified non-spatial rendering attributes. For example, in prior art systems, level of detail is typically assigned as a function of the distance of an object from a current viewpoint. Thus, a brick wall that is close to the current viewpoint may be rendered with a high level of detail. For example, texture maps may be used to highlight the rough texture of the bricks and mortar. In contrast, a second brick wall that is far away from the current viewpoint may be rendered using only solid shading. This technique of using spatial values (e.g., distance from the current viewpoint) to select a level of detail for an object allows the graphics system to operate more efficiently. A viewer is less likely to notice a reduction in the level of detail in an object that is far away from the current viewpoint.

However, this method is not necessarily efficient for displays where large amounts of information are being displayed. For example, if two objects are equidistant from a current viewpoint, the prior art method would render them both using the same level of detail. However, stationary semantic zooming may allow the level of detail to be selected based on other non-spatial criteria (e.g., the relative importance of an object). Advantageously, a system and method for stationary semantic zooming may allow low importance objects to be rendered with a lower level of detail than higher importance objects.

In one embodiment, a method for stationary semantic zooming may include receiving data corresponding to a plurality of objects that are to be rendered. The data may include a first data value and a second data value for each object. These first and second data values may be used to assign each object first and second non-positional rendering attributes (e.g., size and opacity). These first and second data values (or the first and second non-positional rendering attributes) may also be used to select a third non-positional rendering attribute (e.g., level of detail). The third non-positional rendering attribute may then be selected as a function of the first two non-positional rendering attributes. A scene including at least a subset of the objects may then be rendered, with each object being rendered according to its corresponding first, second, and third non-positional rendering attributes.

The non-positional rendering attributes may include attributes such as size, opacity, level of detail, the presence of color saturation, drop shadow, animation, whether or not to render text for the object, font size, sound volume, blink rate, background blending level, and shimmer level. The method may further include re-rendering a particular object in response to detecting a change in one or more of the corresponding data values for the particular object (e.g., a change in the importance level of the object). The re-rendering may include updating the corresponding non-positional or non-spatial attributes. In some embodiments, the detecting and re-rendering may be performed in real-time.

A method for displaying network status in real-time is also contemplated. In one embodiment, the method may include receiving data corresponding to one or more network components connected to the network. The data may include information such as a status value or error value for one or more of the network components. Next, a graphical representation of the network may be rendered, with each network component being represented by a graphical icon. The status values may be used to select two or more non-spatial rendering attributes (e.g., size and opacity) for rendering the graphical icons. The rendering process may include determining a third non-spatial rendering attribute (e.g., level of detail) based on the first two or more non-spatial rendering attributes or status values.

The resulting graphical representation of the network may be output for display on a display device. The display device may be local to the computer generating the graphical representation, or it may be remote and connected to the computer via a computer network such as the Internet. In some embodiments, the status values of the network components may be updated (preferably in real-time), with the non-spatial rendering attributes for the corresponding graphical icons also being updated accordingly. The graphical representation of the network may also be re-rendered, with the re-rendering preferably being performed on a substantially real-time basis. In one embodiment, the graphical representation may be rendered in stereo to allow for display on a stereo head-mounted display.

A method for displaying dynamic real estate information is also contemplated. In one embodiment, the method may include receiving data corresponding to one or more real estate properties in a particular neighborhood. The data may include a status value for one or more of the properties. The status value may be indicative of whether the corresponding property is currently for sale, and/or the current asking price for the corresponding property. A graphical representation of the neighborhood may be rendered, with the properties being represented by three-dimensional graphical icons. The status value for each property may be used to select two or more non-positional rendering attributes (e.g., color tint and opacity) for rendering the three-dimensional graphical icons. The two or more non-positional rendering attributes may be used to select a third non-positional rendering attribute (e.g., a level of detail) for the corresponding three-dimensional graphical icon.

The resulting graphical representation of the neighborhood may be rendered and displayed on a display device. Updates of the status values may be received, and the graphical representation of the neighborhood may be re-rendered to reflect the updated status values. In one embodiment, the re-rendering and updating may be performed on a substantially real-time basis. For example, real-time status information regarding asking price may be used to select a level of transparency and a scaling value (i.e., size factor) as the first and second non-positional rendering attributes. As noted above, these non-positional rendering attributes may in turn be used to select a third non-positional rendering attribute such as level of detail for the three-dimensional graphical icons.

The methods described above may advantageously be implemented as a computer program that is embodied or stored on a computer-readable medium (e.g., such as a computer diskette, CD-ROM, DVD-ROM, or RAM).

A computer system for displaying information is also contemplated. In one embodiment, the computer system may include a first memory and a processor. The processor may be configured to read data from the first memory and to render pixels corresponding to one or more graphics objects. As part of the rendering process, the processor may be configured to select one or more auxiliary rendering attributes based on the one or more non-positional attributes. A second memory (e.g., a frame buffer) may be coupled to the processor and configured to store pixels rendered by the processor. A display device may be configured to read the pixels from the second memory and display them to form an image.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Please note that the section headings used herein are for organizational purposes only and are not meant to limit the description or claims. The word "may" is used in this application in a permissive sense (i.e., having the potential to, being able to), not a mandatory sense (i.e., must). Similarly, the word include, and derivations thereof, are used herein to mean "including, but not limited to."

DETAILED DESCRIPTION OF THE PREFERRED EMBODIMENTS

Figure 1:
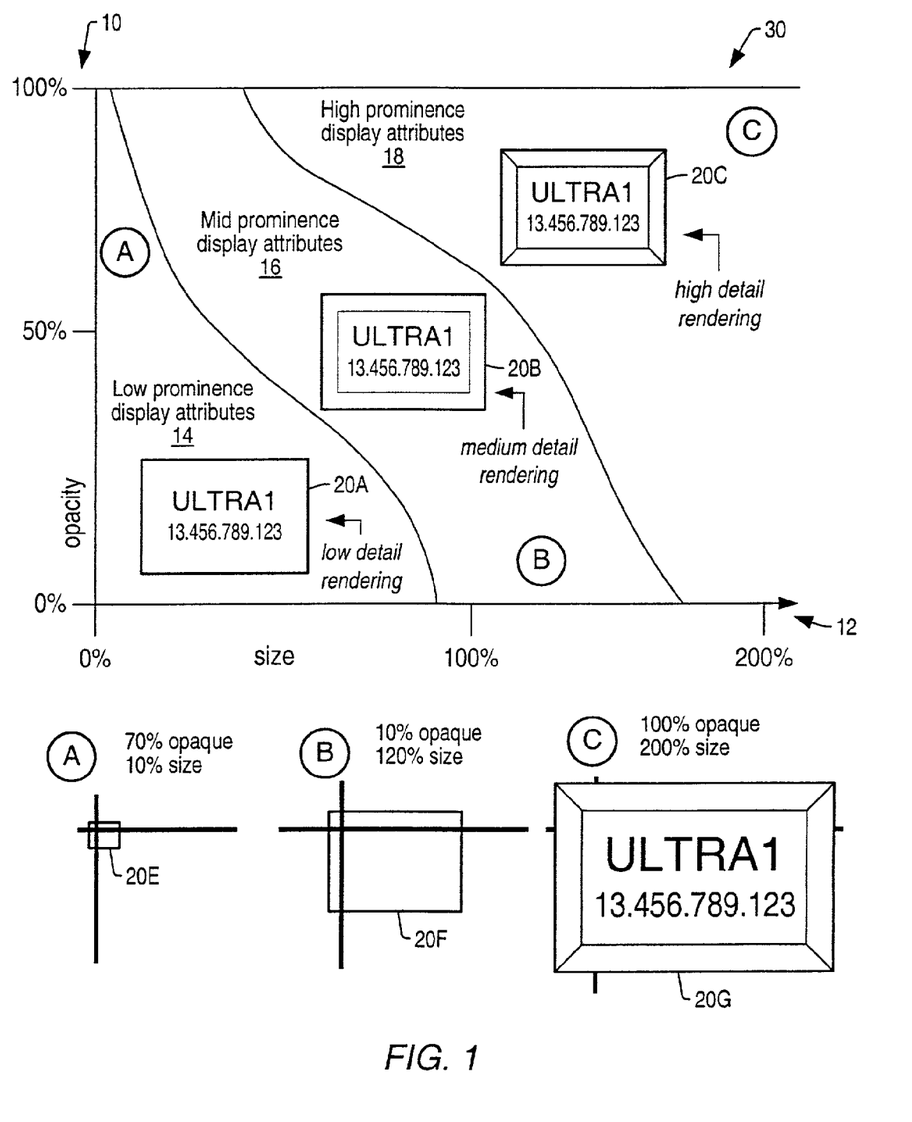
FIG. 1 is a diagram of one embodiment of a method for performing stationary semantic zooming.

Turning now to FIG. 1, details of one embodiment of a method for stationary semantic zooming are shown. As noted above, when an object is drawn as small, highly transparent, or in an otherwise non-prominent state, a highly detailed rendering may be both computationally inefficient and a distraction for the user. In most modern graphic systems, an object being displayed may have a number of different attributes that affect its rendering. For example, these attributes may include not only position on the display, but also non-positional attributes (also referred to as non-spatial attributes) such as opacity, size, tint, drawing order, blinking rate, and other features. Some objects may be identified or tagged as having text labels or highlights. Other objects may be tagged as the virtual source for auditory information.

Together, these non-spatial attributes may define an N-dimensional display space. Portions of this display space may correspond to highly prominent regions, while other portions may correspond to low prominence regions. For example, objects that are positioned near the center of the display space and that have both a large size and a high opacity, may be assigned a highly prominent set of attribute values. This N-dimensional space may be divided into M disjoint regions, with each of the M regions having a particular level of detail associated with it. More detail may be associated with higher prominence regions, while lower detail may be associated with lower prominence regions. Thus, each object may have M different levels of detail, wherein each level of detail is associated with a particular region or prominence value. When an object is rendered, it may refer to a particular level of detail as well as the specific attribute values used to select the particular level of detail. Advantageously, this may result in objects with low prominence being rendered quickly (i.e., with little detail). Similarly, objects with high prominence values are rendered with higher levels of detail. Advantageously, showing full detail for the more prominent objects may be more suitable to the viewer because the viewer will not be distracted by the irrelevant or less relevant details. Thus, the user may be concerned with more prominent objects while referring to the less prominent objects primarily for context.

In the figure, graph 30 illustrates one example of a method for dividing a three-dimensional space of rendering attributes into a number of regions corresponding to object prominence. In this example, the graph 30 is defined by an opacity axis 10 and a size axis 12. Objects that have low prominence fall within region 14 (region A). Thus, objects having low prominence attributes are rendered with a relatively small size and/or a relatively low opacity. As shown in the figure, the low prominence region 14 extends from (a) objects having sizes of zero to approximately 90% with low opacity, to (b) objects having a size of less than 10% with 100% opacity.

Region 16 corresponds to medium prominence objects. As shown on the figure, region 16 (region B) extends from (a) objects having a size of 90% to approximately 160% with low opacity, to (b) objects that have a 5% to 40% size with 100% opacity. Objects falling within region 16 are rendered with a medium level of detail.

Region 18 corresponds to highly prominent objects. Region 18 (region C) extends from (a) objects that are roughly 40% in size but 100% opaque, to (b) objects that are 160% or greater in size with low opacity. Objects having size and opacity combinations falling within region 18 are rendered with high detail.

Thus, object 20A may be rendered with low detail, object 20B may be rendered with medium detail, and object 20C may be rendered with high detail. Similarly, three additional examples of size and opacity combinations are illustrated with objects 20E, 20F, and 20G. Object 20E, with an approximately 70% opacity and 10% size falls within region 14, thereby being rendered with low detail. Object 20F with a 10% opacity and under 20% size falls within region 16 and therefore is rendered with medium detail. Object 20G with 100% opacity and 200% size falls within region 18 and thus is rendered with high detail.

Note, while opacity and size form two axes of graphic 30, other types of non-spatial display attributes may be used to determine levels of detail for stationary semantic zooming. For example, brightness and size may be used, or brightness and color. Similarly, while size and opacity are used to select a level of detail, size and opacity may be used to select other types of non-spatial rendering attributes in addition to, or in lieu of, level of detail. For example, combinations of size and opacity may be used to select a brightness attribute or the level of super-sampling utilized to render the particular object.

Figure 2:
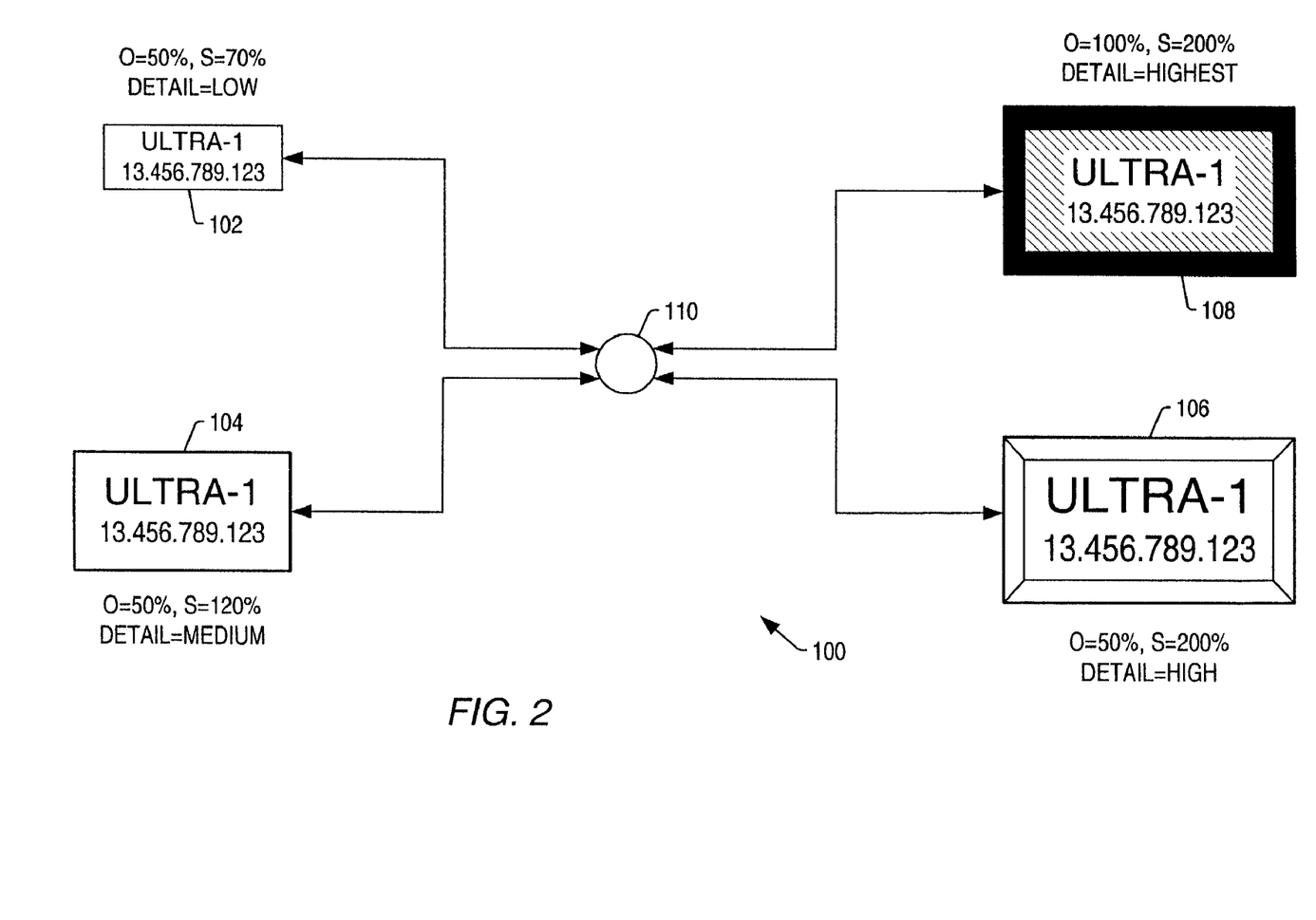
FIG. 2 is a diagram of one example of a method for displaying network status in real-time using one embodiment of stationary semantic zooming.

Turning now to FIG. 2, one embodiment of a method for stationary semantic zooming is shown. In this example, a diagram of a small computer network 100 is shown. The diagram includes icons for a switch 110 and computers 102, 104, 106, and 108. In this example, the amount of traffic generated by each particular computer is used to determine an opacity and size attributes for the corresponding icon or graphic object that is to be displayed. For example, computer 102 generates a very small amount of traffic through switch 110. Thus, computer 102 may be assigned a relatively low opacity and size value (e.g., opacity equaling 50%, and size equals 70%). Thus, based on the opacity and size values, computer 102 may be rendered using a relatively low level of detail.

In contrast, computer 108 may generate a relatively high level of traffic through switch 110. Thus computer 108 may be assigned a relatively high level of opacity and size (e.g., opacity equaling 100% and size equaling 200%). Thus, computer 108 may be rendered with the highest level of detail. In this example, the highest level of detail includes texture mapping and other display effects such as bump mapping (e.g., to generate the beveled edges of the icon). In contrast, computer 102 may be rendered with a low level of detail that does not utilize texture mapping. Instead, computer 102 may be shaded one solid color. Computers 104 and 106 each generate levels of traffic between those of computer 102 and computer 108. Thus, computers 104 and 106 are assigned opacity and size, values that correspond to levels of detail between those of objects 102 and 108.

Figure 3:
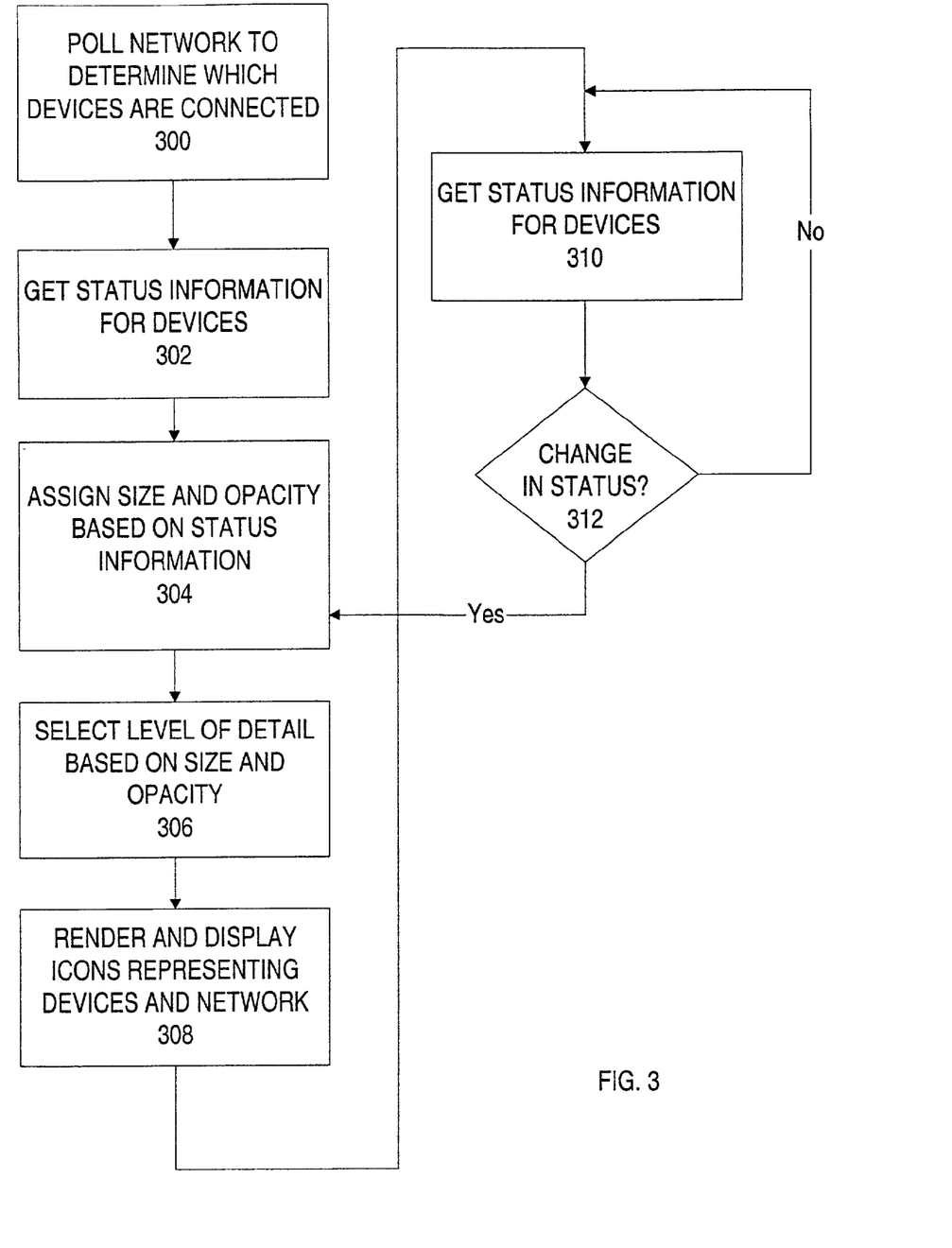
FIG. 3 is a flowchart of one example of method for displaying network status in real-time using one embodiment of stationary semantic zooming.

Turning now to FIG. 3, one embodiment of a method for displaying network status using stationary semantic zooming is shown. In this embodiment, a network is polled to determine which devices are connected to it (step 300). Next, status information may be obtained for each device connected to the network (step 302). Based on the status information, size and opacity values will be assigned to the graphics objects (e.g., icons) that represent the devices connected to the network. Size and opacity values may be assigned to the graphics objects based on the previously obtained status information (step 304). Next, a level of detail may be selected based on the size and opacity values for the graphics objects (step 306). The graphics objects may then be rendered as part of a graphical representation of the status of the network (step 308). The application may also be configured to receive updates of the status of the devices and the network as a whole (step 310). If there is a change in status (step 312), new size and opacity values and corresponding levels of detail may be assigned to the graphics objects representing the devices that have a changed status.

Advantageously, this method may result in the display of a graphical image of the network, wherein devices operating normally that require less attention from the network supervisor may be rendered with lower levels of detail and smaller sizes and lower opacities. Advantageously, the method may be implemented so as to allow the network supervisor or program user to adjust the size of a particular icon or graphics object to suit the user's preference. Advantageously, however, even though a particular icon may be sized to a larger size, this does not necessarily mean that the corresponding level of detail needs to be changed. Furthermore, in some embodiments, this method may advantageously allow more information to be displayed in a more useful manner, even on a smaller display.

Figure 4:
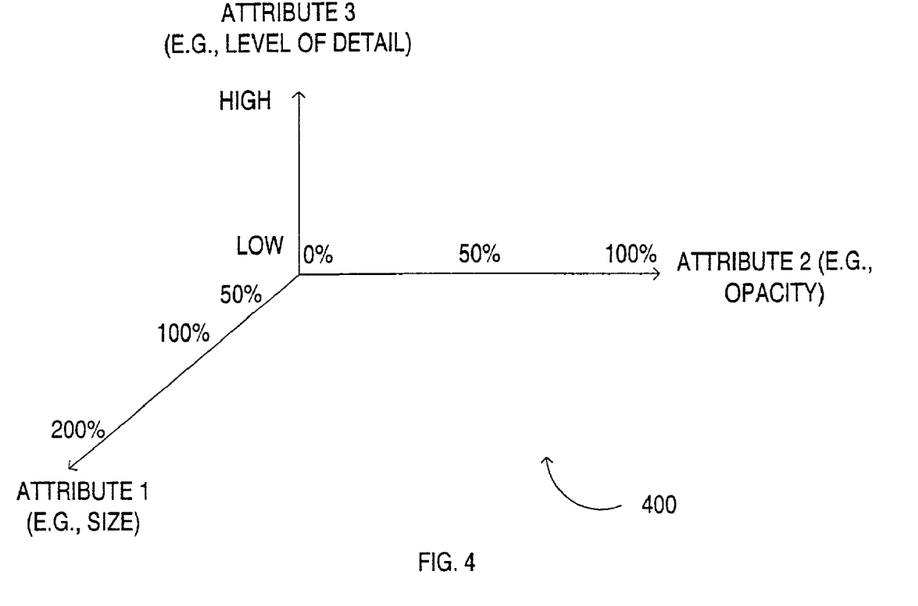
FIG. 4 is a diagram illustrating one embodiment of a method for relating multiple non-spatial rendering attributes.

Turning now to FIG. 4, one example of a three-dimensional rendering attribute space is shown. Coordinate axes 400 illustrate how a particular attribute 3 (e.g., a particular level of detail) may be related to other non-spatial attributes such as attribute 1 (e.g., size) and attribute 2 (e.g., opacity). As shown in the figure, different rendering attributes may be used together to define regions corresponding to particular levels of a third rendering attribute. While a three-dimensional space is shown in FIG. 4 for explanatory purposes, higher numbers of dimensions may be used to correlate different numbers of rendering attributes (e.g., a four-dimensional space may be used to correlate four different rendering attributes).

Figure 5:
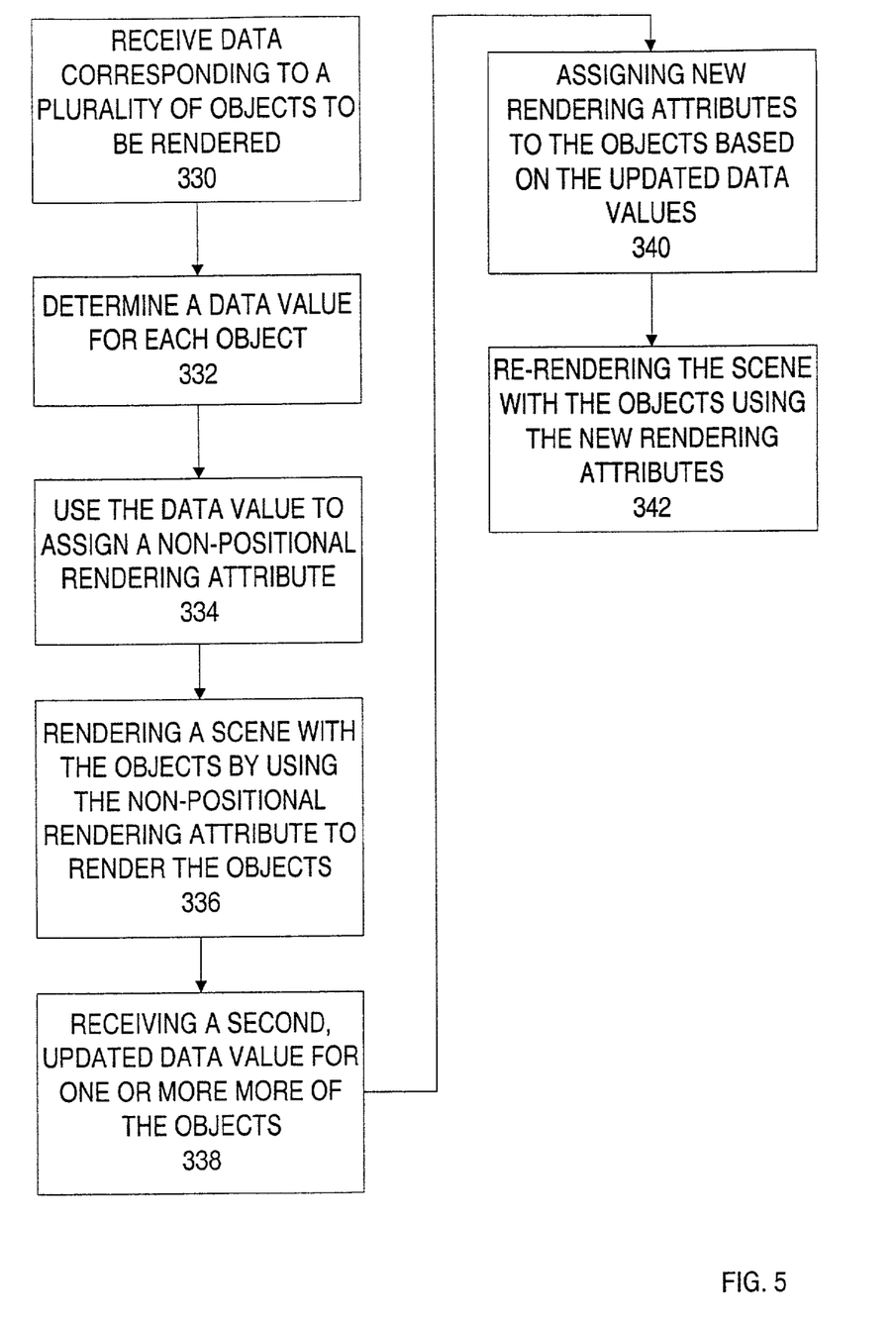
FIG. 5 is a flowchart illustrating one embodiment of a method for stationary semantic zooming.

Turning now to FIG. 5, a flow chart depicting one embodiment of a method for stationary semantic zooming is shown. In this embodiment, data may be received that corresponds to a plurality of objects to be rendered (step 500). Next, two or more data values may be determined for each object (step 502). These data values may be used to assign two non-positional rendering attributes to the corresponding graphics objects (step 504). For example, intensity and opacity rendering attributes may be assigned to the objects based on the two data values. Next, the two data values may be used to select a third non-positional rendering attribute (step 506). Next, the scene may be rendered with the objects using the non-positional rendering attributes that were selected (step 508). Updates for the data values for one or more of the objects may be received (step 510). These updated data values may be used to assign new rendering attributes to the objects (step 512). The scene may then be re-rendered using the new rendering attributes (step 514).

The method described above may be implemented in software (e.g., as a computer program), in hardware, or in a combination of software and hardware. The updated data values may be provided by other software programs or by input from a user. For example, a user viewing the application may elect to "zoom in" on a particular object. This may be performed by the user "clicking" a cursor on the graphical object. As previously noted, however, in some applications it may not be possible to actually enlarge the size of the selected object more than a predetermined amount. Advantageously, however, the system and methods disclosed herein may allow the user to "zoom in" by adding additional levels of detail to object in lieu of or in addition to merely increasing the size of the object.

Figures 6A, 6B:
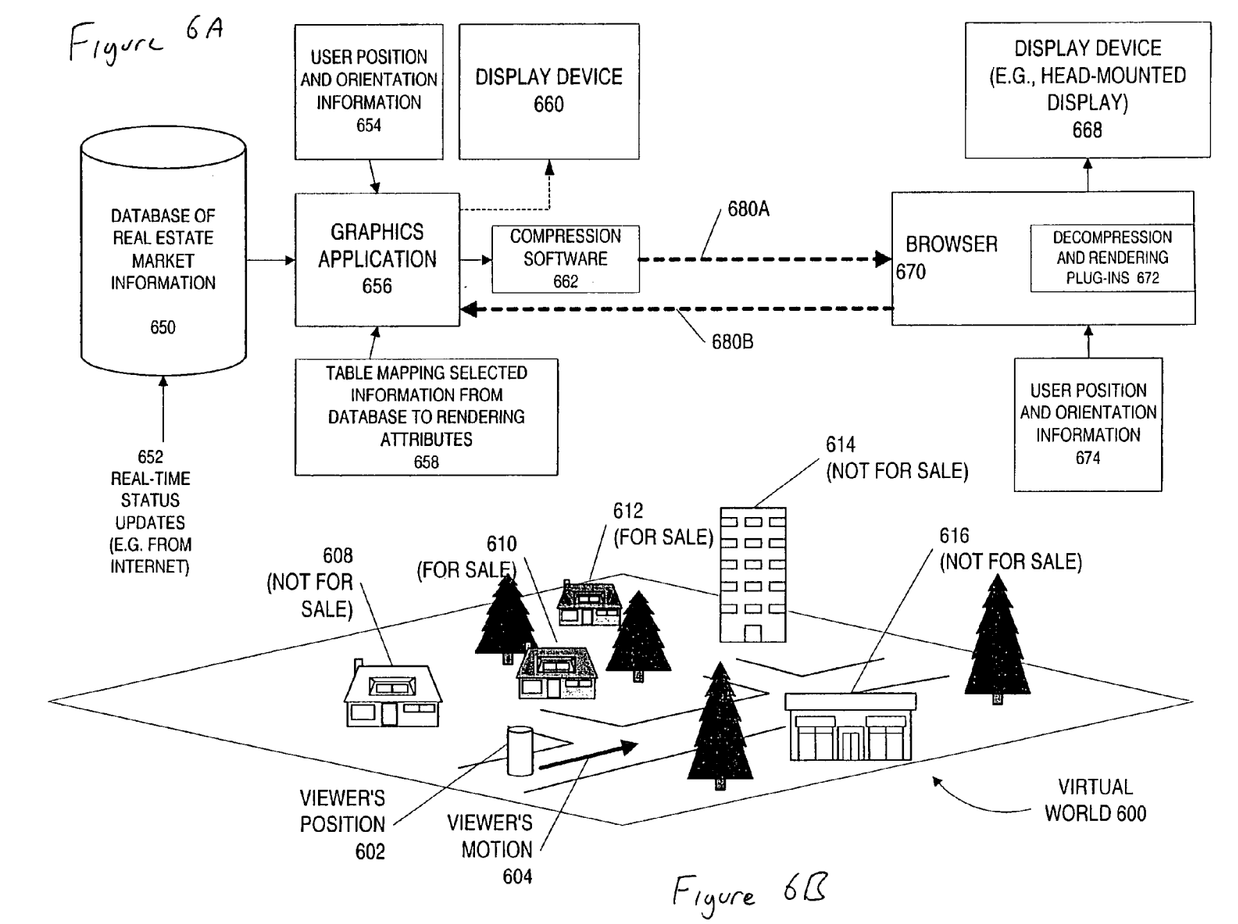
FIGS. 6A and 6B are diagrams illustrating one embodiment of a system and method for displaying real estate information using stationary semantic zooming.

Turning now to FIGS. 6A and 6B, one example of an application configured to utilize stationary semantic zooming is shown. In this example, an application for displaying realty information in a three-dimensional virtual world is shown. Virtual world 600 (FIG. 6B) is rendered with a number of graphics objects representing properties in a particular neighborhood. As shown in the figure, properties 608, 614, and 616, are not for sale. However, for the viewer or user to obtain a realistic feel for the neighborhood, the virtual world application may nevertheless render objects 608, 614, and 616. While these objects or the corresponding buildings may not be for sale, they may nevertheless provide a useful context or useful background information for a viewer. As shown in the figure, a viewer may navigate the virtual world 600 by moving a virtual position 602 in a particular direction 604. Many virtual world applications allow viewers to move in two or more dimensions through the virtual world. For the virtual world to have the proper visual effect, it may not be desirable to render graphics objects 608, 614, and 616 in smaller size. Instead, these lower prominence objects may be rendered with a lower opacity, lower brightness, and/or lower level of detail to indicate that they are not for sale. In contrast, graphics objects 610 and 612 may be rendered with full opacity, brightness, and/or a higher level of detail in order to indicate that these corresponding properties are for sale. In an application such as this, level of detail may be particularly useful together with opacity since the size of a particular object may vary according to its distance from the viewer's position (i.e., prospective projections cause more distant objects to be rendered smaller than close objects). Thus, size may not be useful to differentiate the importance of objects because that would ruin the three-dimensional perspective that the application is attempting to provide to the user. Thus, other non-spatial attributes such as color, intensity, level of detail, brightness, or blinking rate, may be used instead of size.

As shown in FIG. 6A, graphics application 656 may be configured to interface with a database 650 of real estate market information. The database 650 may be updated in real-time for example, using the Internet (652), to access real-time status updates from real estate information providers such as realtors or multiple listing services. The graphics application may be configured to receive user position and orientation information 654 in order to determine viewer's position 602 and viewer's motion 604 in virtual world 600. In one embodiment, user position and orientation information 654 may be obtained by using a head-tracking system that determines the orientation of the viewer's head, typically in connection with a head-mounted display. Graphics application 656 may be configured to render virtual world 600 with the resulting image being output for display on display device 660.

Graphics application 656 may also be configured to access a table that maps selected information from database 650 to rendering attributes such as transparency, brightness, and level of detail. Table 658 may correspond to graph 30 from FIG. 1. Graphics application 656 may also be configured to interface with compression software 662 in order to provide data usable to render virtual world 600 to a remote browser 670. In one embodiment, compression software 662 may utilize geometry compression to transmit compressed geometry data that describes objects 608, 610, 612, 614, and 616, as part of virtual world 600. This compressed information may be transmitted through the Internet (680A) to browser 670 in response to a request (680B) from the browser. Browser 670 may be configured with a decompression and rendering plug-in 672 that is configured to decode the compressed geometry and render the virtual world based on a particular viewer position and orientation.

As shown on the figure, browser 670 may be configured to receive information describing a particular user position and orientation 674. In one embodiment, a simple keyboard and/or mouse may be used to determine the user position and orientation. In other embodiments, more advanced peripherals such as a head-mounted display and head-tracking system may be utilized. Browser 670 may be configured to utilize decompression and rendering plug-in 672 to render virtual world 600 according to the viewer's position 602 to generate an image that is displayed on display device 668. As shown on the figure, display device 668 is preferably a head-mounted display that provides a stereo image to the viewer. Advantageously, application 656 may provide the user with a three-dimensional virtual world view of a neighborhood that allows them to explore which houses are for sale within a proper context, including houses that are not for sale.

A number of additional features may also be implemented in graphics application 656. For example, once the viewer approaches a house that is for sale (e.g., house 610), the user may be enabled to zoom in or actually enter the house and view detailed information such as the asking price. In some embodiments, text may be positioned above particular graphics objects to indicate or provide additional information about the object (e.g., a for sale sign). Thus, the information about the real world object may correspond to a tag as to whether or not to label the object with a for sale sign or text.

In other embodiments, the houses may be tinted or colored according to their asking price. Thus, a user may navigate through virtual world 600 and easily determine which houses are for sale and what their approximate asking price range is. For example, houses in the $100,000 to $300,000 range may be rendered using green colors or a green tint, while houses in the $300,000 to $600,000 range may be rendered using a yellow tint, and houses in the $600,000 and up range may be rendered in a red tint. Advantageously, the application may prompt the user to define a range of interest and then adjust the non-spatial rendering attributes accordingly. For example, the color-to-sales-price mapping may be changed based on user input. Additional types of non-spatial rendering attributes that may be adjusted based on user input and/or real-time status updates may include the size of an object (e.g., width and/or height), color saturation, prominence, sound (e.g., volume level based on virtual distance from the object to the viewer's position 602), highlighting, the presence of borders, drop shadows, blinking highlights, and crawling outlines (e.g., a wiggling dashed line moving around the object).

Note, the applications illustrated above are examples, and other types of applications may be configured to utilize stationary semantic zooming. For example, a two-dimensional overview of a storage area network having thousands of hard drives may be shown for monitoring purposes. The application may allow the user to scroll back and forth in time with icons corresponding to different drives being highlighted in different non-spatial manners to allow for reporting of different errors. For example, only the names of drives with errors may be shown in one embodiment. Thus, non-spatial object attributes (e.g., object status, number of errors, sale price) may be utilized to select two or more non-spatial rendering attributes. These non-spatial attributes may in turn be used to select a third or more additional non-spatial rendering attributes. These non-spatial rendering attributes may be utilized to render the corresponding graphics object.

Figure 7:
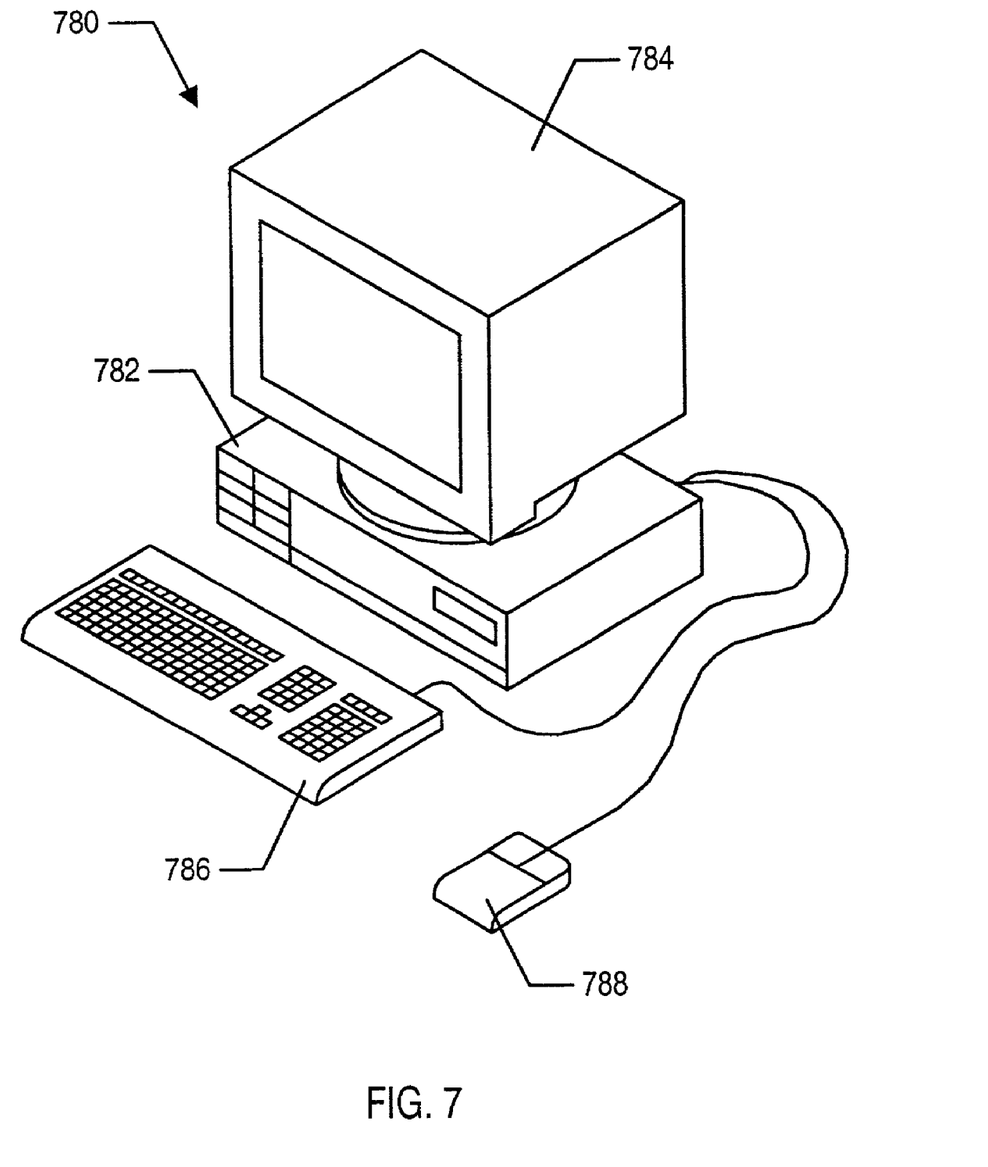
FIG. 7 is diagram of one embodiment of a computer system that may be used to implement stationary semantic zooming.

Computer System—FIG. 7

Referring now to FIG. 7, one embodiment of a computer system 780 that includes a graphics system that may be used to implement one embodiment of stationary semantic zooming is shown. The graphics system may be comprised in any of various systems, including a computer system, network PC, Internet appliance, a television, including HDTV systems and interactive television systems, personal digital assistants (PDAs), virtual reality systems, and other devices which display 2D and or 3D graphics, among others.

As shown, the computer system 780 comprises a system unit 782 and a video monitor or display device 784 coupled to the system unit 782. The display device 784 may be any of various types of display monitors or devices (e.g., a CRT, LCD, or gas-plasma display). Various input devices may be connected to the computer system, including a keyboard 786 and/or a mouse 788, or other input device (e.g., a trackball, digitizer, tablet, six-degree of freedom input device, head tracker, eye tracker, data glove, or body sensors). Application software may be executed by the computer system 780 to display graphical objects on display device 784.

Figure 8:
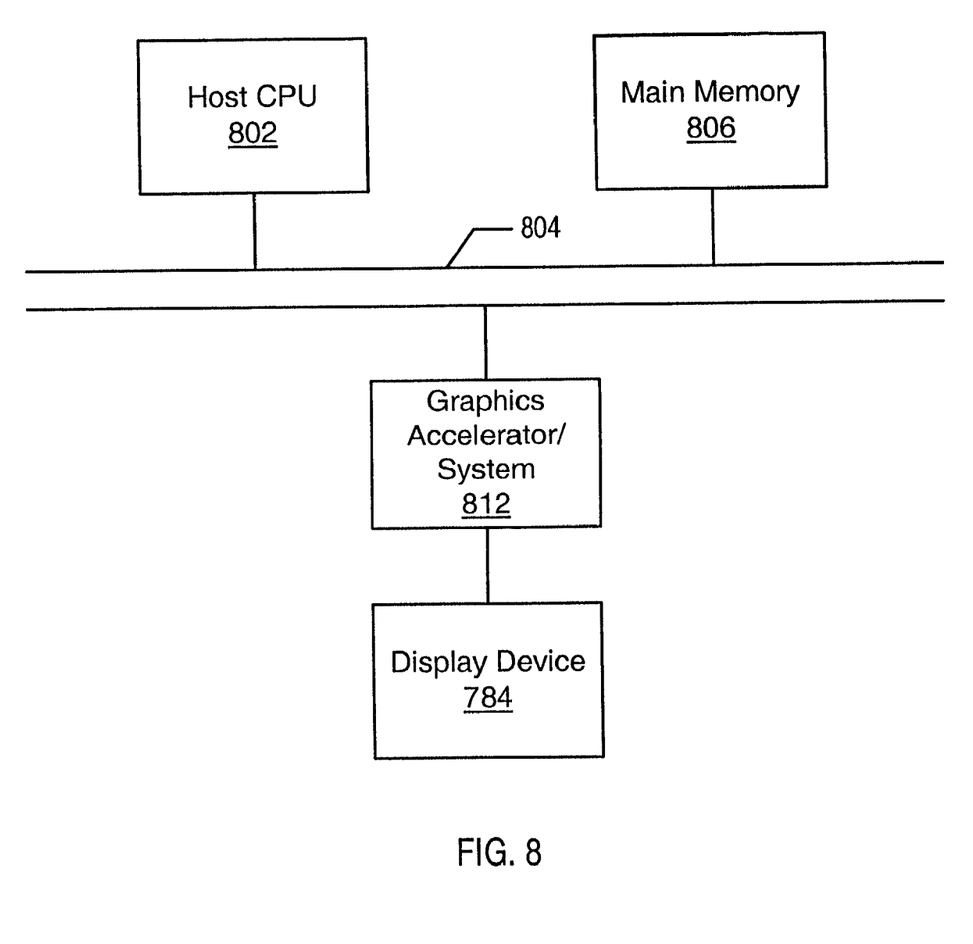
FIG. 8 is a simplified block diagram of the computer system from FIG. 7.

Computer System Block Diagram—FIG. 8

Referring now to FIG. 8, a simplified block diagram illustrating the computer system of FIG. 7 is shown. Elements of the computer system that are not necessary for an understanding of the present invention are not shown for convenience. As shown, the computer system 780 includes a central processing unit (CPU) 802 coupled to a high-speed memory bus or system bus 804 also referred to as the host bus 804. A system memory 106 may also be coupled to high-speed bus 804.

Host processor 802 may comprise one or more processors of varying types, e.g., microprocessors, multi-processors and CPUs. The system memory 806 may comprise any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 804 may comprise one or more communication or host computer buses (for communication between host processors, CPUs, and memory subsystems) as well as specialized subsystem buses.

In FIG. 8, a graphics system 812 is coupled to the high-speed memory bus 804. The 3-D graphics system 812 may be coupled to the bus 804 by, for example, a crossbar switch or other bus connectivity logic. It is assumed that various other peripheral devices, or other buses, may be connected to the high-speed memory bus 804. It is noted that the graphics system may be coupled to one or more of the buses in computer system 780 and/or may be coupled to various types of buses. In addition, the graphics system may be coupled to a communication port and thereby directly receive graphics data from an external source, e.g., the Internet or a network. As shown in the figure, one or more display devices 784 may be connected to the graphics system 812 comprised in the computer system 780.

Host CPU 802 may transfer information to and from the graphics system 812 according to a programmed input/output (I/O) protocol over host bus 804. Alternately, graphics system 812 may access the memory subsystem 806 according to a direct memory access (DMA) protocol or through intelligent bus mastering.

A graphics application program conforming to an application programming interface (API) such as OpenGL or Java 3D may execute on host CPU 802 and generate commands and data that define a geometric primitive (graphics data) such as a polygon for output on display device 784. As defined by the particular graphics interface used, these primitives may have separate color properties for the front and back surfaces. Host processor 802 may transfer this graphics data to memory subsystem 806. Thereafter, the host processor 802 may operate to transfer the graphics data to the graphics system 812 over the host bus 804. In another embodiment, the graphics system 812 may read in geometry data arrays over the host bus 804 using DMA access cycles. In yet another embodiment, the graphics system 812 may be coupled to the system memory 806 through a direct port, such as the Advanced Graphics Port (AGP) promulgated by Intel Corporation.

The graphics system may receive graphics data from any of various sources, including the host CPU 802 and/or the system memory 806, other memory, or from an external source such as a network, e.g., the Internet, or from a broadcast medium, e.g., television, or from other sources.

Note while graphics system 812 is depicted as part of computer system 780, graphics system 812 may also be configured as a stand-alone device (e.g., with its own built-in display). Graphics system 812 may also be configured as a single chip device or as part of a system-on-a-chip or a multi-chip module. Additionally, in some embodiments, certain elements of the illustrated graphics system 812 may be implemented in software.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A method for rendering and displaying information using a computer graphics system, the method comprising:
   receiving data corresponding to a plurality of objects to be rendered, wherein the data includes a first data value and a second data value for each object;
   using the first and second data values for each object to assign each object a first non-positional rendering attribute and a second non-positional rendering attribute;
   using the first and second non-positional rendering attributes to select a third non-positional rendering attribute; and
   rendering a scene including at least a subset of the plurality of objects, wherein said rendering is performed according to the first, second, and third non-positional rendering attributes, and wherein the scene is displayable on a display device.

2. The method of claim 1, wherein the first non-positional rendering attribute is size.

3. The method of claim 2, wherein the second non-positional rendering attribute is opacity.

4. The method of claim 3, wherein the third non-positional rendering attribute is level of detail.

5. The method of claim 1, wherein the first and second non-positional rendering attributes are each, one of the following: color saturation, drop shadow, animation.

6. The method of claim 1, wherein the first non-positional rendering attribute is an indicator of whether or not to render text for the object.

7. The method of claim 1, wherein the first non-positional rendering attribute is font size.

8. The method of claim 1, wherein the first non-positional rendering attribute is sound volume.

9. The method of claim 1, wherein the first non-positional rendering attribute is blink rate.

10. The method of claim 1, wherein the first non-positional rendering attribute is background blending level.

11. The method of claim 1, wherein the first non-positional rendering attribute is shimmer level.

12. The method of claim 1, wherein the objects are virtual objects.

13. The method of claim 1, further comprising re-rendering a particular object in response to detecting that the corresponding first data value for the particular object has changed, wherein said re-rendering includes updating the first non-positional attribute.

14. The method of claim 13, wherein the detecting and re-rendering is performed in real-time.

15. The method of claim 1, further comprising zooming in on a particular object by reconfiguring one or more of the non-positional attributes.

16. A computer system, comprising:
   a first memory configured to store data, wherein the data includes information describing one or more objects and two or more non-positional attributes for the one or more objects;
   a processor configured to:
      read the data from the first memory;
      render pixels depicting the one or more objects;
      select, for each of the one or more objects, one or more auxiliary rendering attributes corresponding to a level of rendering detail, wherein the processor is configured to select, based on the two or more non-positional attributes, the one or more auxiliary rendering attributes; and
      render the pixels for each of the one or more objects according to the corresponding one or more auxiliary rendering attributes;
   a second memory configured to store the pixels rendered by the processor; and
   a display device, wherein the display device is configured to display the pixels stored in the second memory.

17. The computer system of claim 16, wherein one of the one or more auxiliary rendering attributes is color saturation.

18. The computer system of claim 16, wherein one of the one or more auxiliary rendering attributes is a drop shadow.

19. The computer system of claim 16, wherein one of the one or more auxiliary rendering attributes is animation.

20. The computer system of claim 16, wherein one of the one or more auxiliary rendering attributes is opacity.

21. The computer system of claim 16, wherein one of the one or more auxiliary rendering attributes is transparency.

22. The computer system of claim 16, wherein one of the one or more auxiliary rendering attributes is an indicator of whether or not to render text for the object.

23. The computer system of claim 16, wherein one of the one or more auxiliary rendering attributes is font size.

24. The computer system of claim 16, wherein one of the one or more auxiliary rendering attributes is sound volume.

25. The computer system of claim 16, wherein one of the one or more auxiliary rendering attributes is blink rate.

26. The computer system of claim 16, wherein one of the auxiliary rendering attributes is background blending level.

27. The computer system of claim 16, wherein one of the one or more auxiliary rendering attributes is shimmering.

28. The computer system of claim 16, wherein the processor is configured to read updated data from the first memory, wherein the processor is configured to use the updated data to re-render the pixels depicting the one or more objects, wherein the processor is configured to select one or more updated auxiliary rendering attributes corresponding to an updated level of rendering detail based on the updated data.

29. The computer system of claim 28, wherein the updating and re-rendering is performed substantially in real-time.

* * * * *